US005640545A

United States Patent [19]

Baden et al.

[11] Patent Number: 5,640,545

[45] Date of Patent: Jun. 17, 1997

[54] FRAME BUFFER INTERFACE LOGIC FOR CONVERSION OF PIXEL DATA IN RESPONSE TO DATA FORMAT AND BUS ENDIAN-NESS

[75] Inventors: Eric A. Baden, Saratoga; Brian A. Childers, Santa Clara, both of Calif.

[73] Assignee: Apple Computer, Inc., Cupertino, Calif.

[21] Appl. No.: 434,191

[22] Filed: May 3, 1995

[51] Int. Cl.[6] .......... G06F 15/00

[52] U.S. Cl. .......... 395/515

[58] Field of Search .......... 395/161, 162, 395/163, 164, 165, 166; 345/185, 189.98; 370/112

[56] References Cited

U.S. PATENT DOCUMENTS

| | | | |
|---|---|---|---|
| 5,257,348 | 10/1993 | Roskowski et al. | 395/157 |
| 5,263,138 | 11/1993 | Wasserman et al. | 395/294 |
| 5,274,753 | 12/1993 | Roskowski et al. | 395/135 |
| 5,295,245 | 3/1994 | Alcorn et al. | 395/164 |
| 5,301,272 | 4/1994 | Atkins | 395/163 |
| 5,446,839 | 8/1995 | Dea et al. | 395/163 |

OTHER PUBLICATIONS

*PowerPC 601 RISC Microprocessor User's Manual*, pp. 2–42 through 2–70; 8–1 through 8–36; and 9–1 through 9–52, published by Motorola in 1993.

*PCI Local Bus Specification*, Review Draft Revision 2.1, published Oct. 21, 1994 by the PCI Special Interest Group, P.O. Box 14070, Portland, OR 97214.

*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Mark R. Powell
*Assistant Examiner*—Cao H. Nguyen
*Attorney, Agent, or Firm*—Burns, Doane, Swecker & Mathis, L.L.P.

[57] ABSTRACT

An apparatus for transforming pixel data from a data bus into an expected format for storage in a frame buffer has a first multiplexor, a second multiplexor and a controller. The first multiplexor includes two data inputs coupled to the data bus so that the first data input provides pass-through of received data, and the second data input provides end-for-end byte swapping of bus data. Input selection is made by a byte-swap control signal. The second multiplexor includes an output and four data inputs. The output of the first multiplexor is coupled to each of the four inputs of the second multiplexor so as to provide for end-for-end byte swapping from two of the inputs, end-for-end word swapping from another one of the inputs, and end-for-end half-word swapping from a fourth input. The second multiplexor is responsive to a reorder control signal that alternatively selects one of the first, second, third and fourth inputs of the second multiplexor to be gated to the output of the second multiplexor. The controller generates the byte swap control signal and the reorder control signal. Generation of the byte swap control signal is based on an endian-ness characteristic of the data bus. Generation of the reorder control signal is based on a pixel depth of pixel data on the data bus and is based further on a pixel endian-ness type of pixel data on the data bus.

4 Claims, 7 Drawing Sheets

FRAME BUFFER INTERFACE LOGIC FOR CONVERSION OF PIXEL DATA IN RESPONSE TO DATA FORMAT AND BUS ENDIAN-NESS

BACKGROUND

The present invention relates to computer frame buffer controllers, and more particularly to interface logic in a frame buffer controller for converting pixel data into a standard format for storage in the frame buffer when that pixel data was received in any of a number of predefined pixel formats and was communicated to the frame buffer controller by means of a bus that may operate in a big-endian or little-endian mode.

In computer systems, it is known in the art to utilize a computer graphics controller to serve as an interface between a video frame buffer, such as a video random access memory (VRAM), and other system components, such as one or more central processing units (CPUs) and other video input resources. Typically, the video frame buffer is coupled to the other system components by means of a system bus which conveys both address and pixel data information. The frame buffer stores pixel data that is intended to be retrieved and converted, as necessary, for display on an image display device, such as a cathode ray tube (CRT). The hardware which retrieves the pixel data from the frame buffer for conversion and presentation to the image display device is known in the art as a random access memory digital-to-analog converter (RAMDAC). The RAMDAC is not usually coupled to the system bus, but instead is coupled to a special port for accessing the frame buffer. This port is called a serial access memory (SAM) port.

In order for a RAMDAC to perform the job of converting pixels retrieved from the frame buffer for display on an image display device, it is necessary that the pixels be stored within the frame buffer in a uniform format that is compatible with the RAMDAC's mode of operation. However, pixels may be encoded in any of a number of well-known formats (such as RGB 8 bpp, RGB 16 bpp, RGB 32 bpp and YUV 16 bpp), and it cannot be generally assumed that a pixel-generating device or application program will output pixels in a format that is compatible with that which is required, by the RAMDAC, to be stored into the frame buffer. In such cases, some intermediating mechanism for converting the pixels from one format into another is required. It is noted that such a conversion mechanism may have to be bi-directional if a computer resource expects to write and read pixels to/from the frame buffer in a format that is incompatible with that which is required by the RAMDAC.

In the past, such conversion has been performed by the pixel data source itself. For example, a processor that generates pixel data having an incompatible format might subject the pixels to conversion software before transmitting them to the frame buffer. Of course, if the pixels are subsequently read back from the frame buffer, then the processor would have to subject the received pixels to a reverse conversion algorithm before supplying them to an application program that is expecting the incompatible format. This technique suffers from a number of drawbacks, not the least of which is the fact that the processor must always "know" what pixel format the RAMDAC is expecting to see. This solution is also inefficient, since it requires that the conversion process be performed by each and every pixel generating device that uses an incompatible pixel format.

U.S. Pat. No. 5,301,272, which is incorporated herein by reference, describes an alternative solution that permits the frame buffer controller to recognize when a received pixel is supplied in a pixel format that is incompatible with that which should be used for storage into the frame buffer. With this capability, the necessary conversion logic can be centrally located within the frame buffer controller itself, thereby eliminating the need to perform conversion in the pixel-generating units, as in previous solutions. As described in the cited U.S. patent, the capability relies on the use of address aliasing. That is, a "pixel type tag" is included as part of the frame buffer address that accompanies the pixel when it is transmitted to the frame buffer controller. The pixel type tag indicates to the frame buffer controller the format in which the pixels are encoded. It is up to the frame buffer controller to include the necessary logic to decode the pixel type tag and perform the necessary operations to convert the received pixels into the format that is to be stored into the frame buffer.

The pixel conversion problem is made even more difficult by the fact that a number of well-known bus standards have evolved which are incompatible with one another. For example, one bus type may utilize separate address and data lines, while another bus type may multiplex a common set of lines to communicate address and data information. This type of incompatibility, which does not pose significant problems in relation to frame buffers, may be handled by appropriate hardware contained within a bus bridge for allowing devices on one of the buses to communicate with devices connected to the other bus.

However, another type of bus incompatibility, namely "endian-ness incompatibility", does introduce complications related to the goal of converting pixels from one format to another. The endian-ness of a bus refers to the fact that multiple bits, bytes, words, etc., may be communicated in parallel on a bus, with addresses also being provided to refer to particular ones of the bits, bytes, words, etc. Take, for example, the case where the granularity of an address is down to the byte level (i.e., increasing an address by 1 refers to a next byte of data), and a data bus is capable of transferring four bytes in parallel. In a big-endian ("BE") system, a first address would refer to the most significant (i.e., left-most) byte on the data bus, and increasing addresses refer to increasingly less significant bytes. By contrast, in a little-endian ("LE") system, that same first address would refer to the least significant (i.e., right-most) byte on the data bus, and increasing addresses point to increasingly more significant bytes.

To resolve this general incompatibility, bus bridges have applied a rule of "address invariance", wherein the bytes (or whatever size data unit corresponds to the granularity of bus addresses) on a bus are swapped, end-for-end, whenever they cross from one bus to another. This byte-swapping is illustrated in FIG. 1.

While byte-swapping may enable compliance with the address invariance requirements of standardized buses, it does not, in general, enable pixels received from, say, a LE bus to be stored into a BE frame buffer because while the byte swapping guarantees that pixels are placed into their proper location on the bus (i.e., address and byte-lanes), bytes within a pixel can be swapped, thereby causing that pixel to be garbled. An illustration will help make this point clear.

Suppose pixels are encoded in an αRGB 16 bpp (bits per pixel) format. In such a format, α is represented by 1 bit, and the R, G and B codes are each represented by 5 bits of data. In our previous example, where the data bus is capable of conveying 4 bytes of data, a LE system would transmit two pixels per bus cycle in the format shown in FIG. 2A. If the destination of the pixels is a BE frame buffer, the pixels will undergo the byte swapping previously illustrated in FIG. 1.

The results of that byte swapping are shown in FIG. 2B. It can be seen that the order of the two 16-bit pixels has been correctly converted from P1, P0 to P0, P1, but that the pixels themselves have become "scrambled" as a result of their bytes being swapped. In particular, note how the G field in each pixel has been split into two non-contiguous fields, the left-most one occupying the most-significant 3 bits of the pixel and the right-most one occupying the least-significant 2 bits of the pixel. Also, the remaining α, R and B fields are no longer in the proper order.

Similar "pixel scrambling" problems occur when other pixel formats, such as αRGB 32 bpp (α=8 bits; R=8 bits; G=8 bits; and B=8 bits), are transferred between mixed-endian systems. Thus, before such pixels can be stored into the BE frame buffer, some mechanism for unscrambling needs to be in place.

The U.S. Patent cited above fails to mention the problem associated with mixed-endian systems, and so is of no help in addressing this problem.

A publication entitled *PCI Multimedia Design Guide*, Revision 1.0 (Mar. 29, 1994), which is distributed by the PCI Multimedia Working Group (part of the PCI Special Interest Group, P.O. Box 14070, Portland, Oreg. 97214), does briefly describe, on pages 17–18, the endian-ness conversion problem associated with pixels. There it is suggested that a technique similar to the address aliasing technique, referred to above, be employed to enable a frame buffer controller to detect whether a device is trying to access a LE or BE "aperture" in the frame buffer. If for example, a BE frame buffer controller detects an access request to a LE aperture, the frame buffer controller must, before storing the pixels into the frame buffer, first reorder them without scrambling. Detecting the need for a conversion would be based on a type tag in the address, similar to the pixel type tag described in the Atkins patent. However, the *PCI Multimedia Design Guide* is silent concerning any implementation for appropriately converting the pixel data.

SUMMARY

It is therefore an object of the present invention to provide a mechanism in a frame buffer controller for detecting when the endian-ness of a frame buffer access request is incompatible with the physical storage format of the frame buffer, and for correctly making the necessary pixel conversions.

In accordance with one aspect of the present invention, the foregoing and other objects are achieved in an apparatus for transforming a plurality of pixel data into an expected format for storage in a frame buffer, the pixel data having been received on a data bus. The apparatus has a first multiplexor, a second multiplexor and a controller. The first multiplexor includes an output, and two data inputs. The first data input is coupled to the data bus in a manner that provides for pass-through of data from the data bus to the output of the first multiplexor. The second data input is coupled to the data bus in a manner that provides for an end-for-end byte swap of data from the data bus to the output of the first multiplexor, whereby a most significant byte on the data bus becomes a least significant byte at the output of the first multiplexor, a next most significant byte on the data bus becomes a next least significant byte at the output of the first multiplexor, and so on until a least significant byte on the data bus becomes a most significant byte at the output of the first multiplexor. The multiplexor further includes an input for receiving a byte swap control signal that alternatively selects one of the first and second inputs of the first multiplexor to be gated to the output of the first multiplexor.

The second multiplexor includes four data inputs and an output for supplying transformed data to the frame buffer. The first and fourth data inputs are each coupled to the output of the first multiplexor in a manner that provides for an end-for-end byte swap of first multiplexor output data to the output of the second multiplexor, whereby a most significant byte at the output of the first multiplexor becomes a least significant byte at the output of the second multiplexor, a next most significant byte at the output of the first multiplexor becomes a next least significant byte at the output of the second multiplexor, and so on until a least significant byte at the output of the first multiplexor becomes a most significant byte at the output of the second multiplexor. The second data input is coupled to the output of the first multiplexor in a manner that provides for an end-for-end word swap of first multiplexor output data to the output of the second multiplexor, whereby a most significant word at the output of the first multiplexor becomes a least significant word at the output of the second multiplexor, and a least significant word at the output of the first multiplexor becomes a most significant word at the output of the second multiplexor. The third data input is coupled to the output of the first multiplexor in a manner that provides for an end-for-end half-word swap of first multiplexor output data to the output of the second multiplexor, whereby a most significant half-word at the output of the first multiplexor becomes a least significant half-word at the output of the second multiplexor, a next most significant half-word at the output of the first multiplexor becomes a next least significant half-word at the output of the second multiplexor, and so on until a least significant half-word at the output of the first multiplexor becomes a most significant half-word at the output of the second multiplexor.

The second multiplexor further includes an input for receiving a reorder control signal that alternatively selects one of the first, second, third and fourth inputs of the second multiplexor to be gated to the output of the second multiplexor.

The controller within the apparatus generates the byte swap control signal and the reorder control signal. Generation of the byte swap control signal is based on an endian-ness characteristic of the data bus (i.e., whether the data bus is operating in a little-endian or big-endian mode). Generation of the reorder control signal is based on a pixel depth of pixel data on the data bus and is based further on a pixel endian-ness type of pixel data on the data bus. Pixel depth refers to the number of bits per pixel. The pixel endian-ness type indicates whether the sending entity (in the case of frame buffer writes) or receiving entity (in the ease of frame buffer reads) considers the pixels themselves to be in a big-endian or little-endian format.

In accordance with another aspect of the invention, the control means decodes the pixel endian-ness type from a pixel endian-ness type tag encoded in an address that is associated with the pixel data on the data bus.

BRIEF DESCRIPTION OF THE DRAWINGS

The objects and advantages of the invention will be understood by reading the following detailed description in conjunction with the drawings in which.

DETAILED DESCRIPTION

Figure 1:
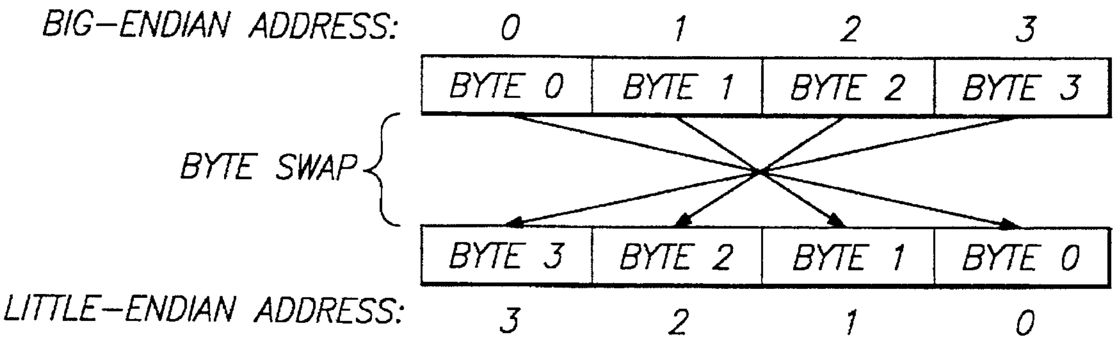
FIG. 1 (PRIOR ART)
FIG. 1 is a block diagram showing the prior art technique of byte-swapping to maintain address invariance when coupling big-endian and little-endian buses.
Figure 2A:
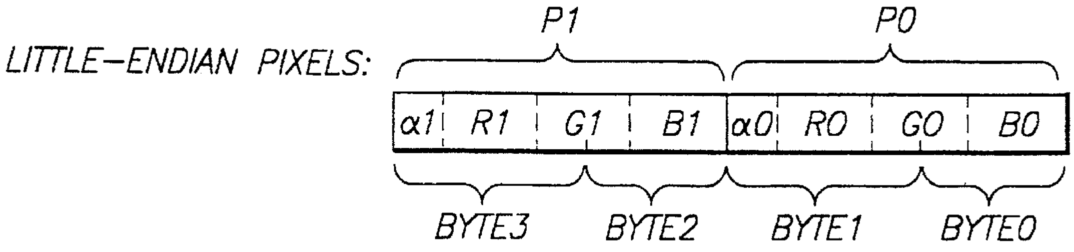
FIGS. 2A and 2B illustrate the problem that is encountered when transferring pixels between mixed-endian systems.
Figure 2B:
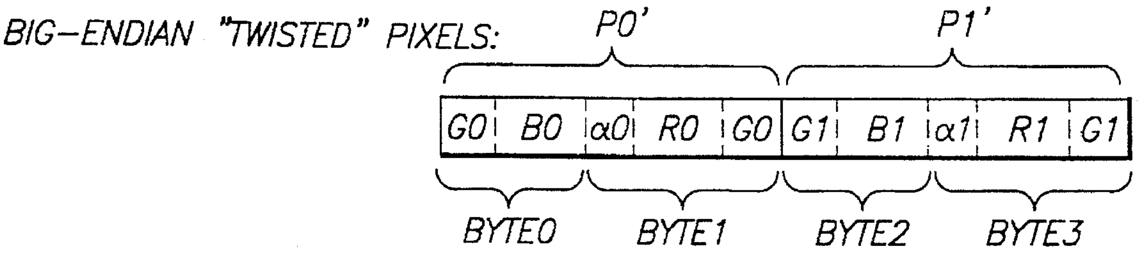

The various features of the invention will now be described with respect to the figures, in which like parts are identified with the same reference characters.

Figure 3:
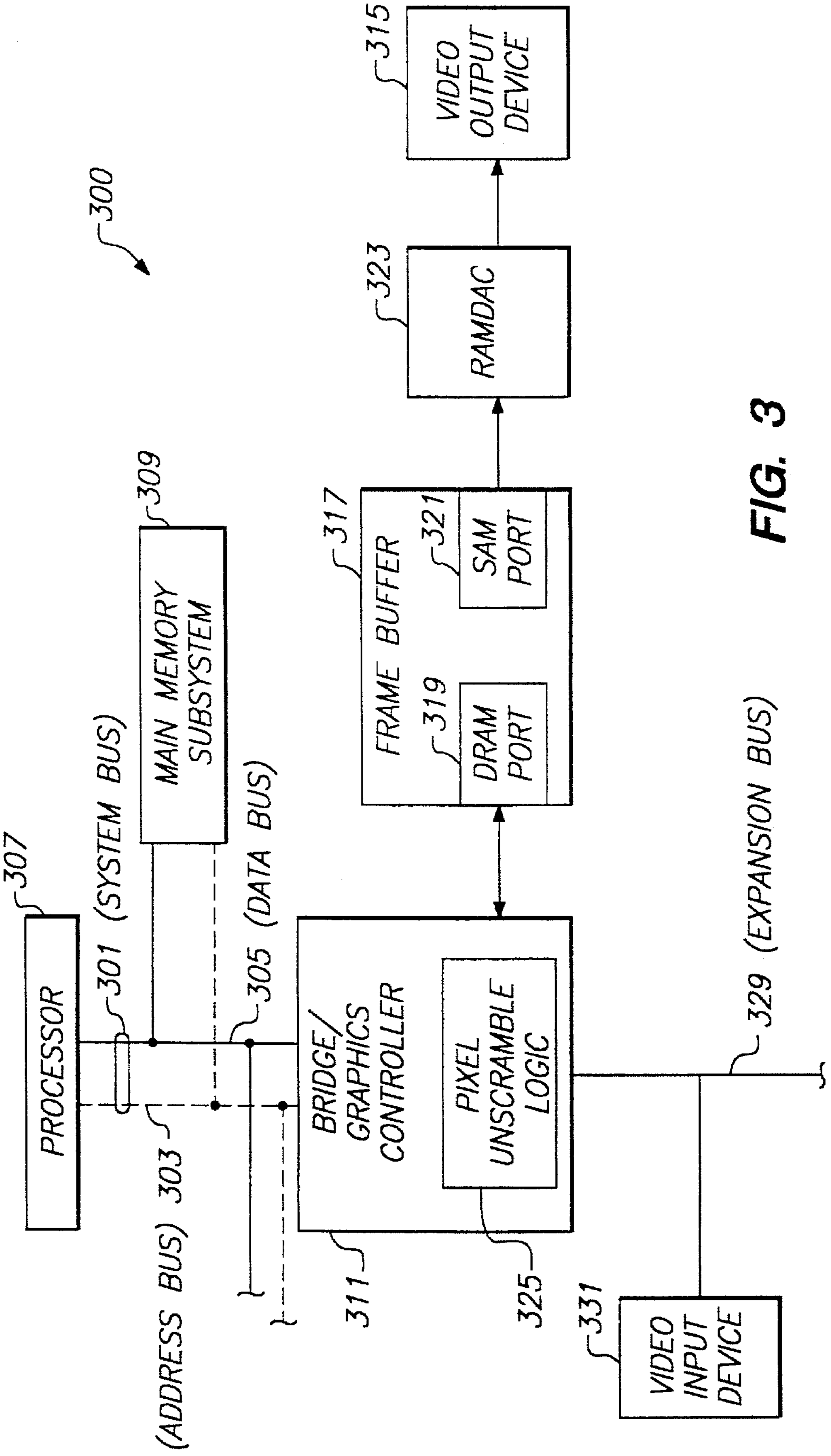
FIG. 3 is a block diagram of a computer system in which the present invention is utilized.

Referring to FIG. 3, the present invention may be used in a computer system 300 of the type shown. It should be understood, however, that the invention is not limited to use only in the illustrated embodiment, but may be used in any mixed-endian environment.

The computer system 300 is based on a system bus 301 that comprises an address bus 303 and a data bus 305. Furthermore, the system bus 301 is preferably of a loosely coupled type that has split-bus transaction capability, such as the system bus found in the Motorola MPC601 RISC microprocessor, which is described in the *PowerPC 601 RISC Microprocessor User's Manual*, published by Motorola in 1993, which is incorporated herein by reference. Alternatively, the system bus 301 may be the loosely coupled system bus, called the ARBUS™, that is described in U.S. patent application Ser. No. 08/432,620 (Attorney Docket No. P1605/172), which was filed by James Kelly et al. on May 2, 1995, and entitled BUS TRANSACTION REORDERING USING SIDE-BAND INFORMATION SIGNALS, and which is incorporated herein by reference. Of significance to the present invention is the fact that each of these buses is primarily a BE bus, although it is noted that the MPC601 RISC microprocessor is capable of passing data across these buses in a LE mode. This feature will be further described below. Of further significance to the present invention is the fact that the data bus 305 is 64 bits wide (although it is not a requirement that all data transfers consist of 64 bits), and that addressability, as expressed by addresses on the address bus 303, has a granularity of one byte (i.e., incrementing an address by 1 causes one to point to a next byte in sequence).

Attached to the system bus 301 is a processor 307, such as the PowerPC™ 601 microprocessor described above, which is capable of operating in a split-bus transaction environment. For purposes of simplifying the drawing, also attached to the system bus 301 is a block designated as main memory subsystem 309. Those having ordinary skill in the art will appreciate that the main memory subsystem 309 may comprise any combination of static or dynamic random access memory (SRAM or DRAM) as well as read only memory (ROM) and cache memory. For further simplification of the drawing, the main memory subsystem 309 also includes arbitration logic for resolving conflicting access requests made to the address and data buses 303, 305. A more detailed description of these features, which are well-known in the art, is beyond the scope of this disclosure.

In the exemplary system 300, image data is displayed on a video output device 315, which may be, for example, an analog RGB monitor. An image to be displayed is stored in a frame buffer 317 as a set of pixels, the form of which may be in accordance with any of a number of well-known pixel formats, such as RGB and YUV. The frame buffer 317 is a video random access memory V/RAM) which is a special type of dynamic RAM (DRAM) that has a DRAM port 319 (from which pixel data may be randomly accessed) and a serial access mode (SAM) port 321, each for accessing the pixel data stored in the frame buffer 317. The SAM port 321 is connected to a RAMDAC 323, which reads the serial stream of pixel data from the frame buffer 317, and converts the digital bit stream into appropriate analog signals for driving the primary video output device 315.

In the exemplary embodiment, the RAMDAC 323 is of a type that expects to receive BE pixel data that may be encoded in any of the following well-known pixel formats: 8 bpp αRGB, 1-5-5-5 αRGB (i.e., 16 bpp) or 8-8-8-8 αRGB (i.e., 32 bpp). Those having ordinary skill in the art will readily be able to adapt the teachings of the present invention to other pixel formats, however.

A combination bridge/graphics controller 311 is provided, which has an interface for connection to the system bus 301, and another interface for connection to the DRAM port 319 of the frame buffer 317. One function of the bridge/graphics controller 311 is to receive frame buffer access requests from the system bus 301 and provide these to the frame buffer 317 for servicing. Since the processor 307 generally operates the system bus 301 in BE mode, there is usually no incompatibility with the RAMDAC 323. However, the possibility for pixel incompatibility exists because the processor 307, as indicated above, may perform bus transfers in LE mode. Furthermore, even if the processor 307 is transferring data in what it considers to be BE mode, the application program that is generating those pixels may in fact be producing LE-pixels which will require conversion before being stored into the frame buffer 317.

Another purpose of the bridge/graphics controller 311 is to provide a path from an expansion bus 329 to the frame buffer 317. In a preferred embodiment, the expansion bus is a well-known standardized bus known as the PCI Local Bus, which is described, for example, in *PCI Local Bus Specification*, Review Draft Revision 2.1, Oct. 21, 1994, which is published by the PCI Special Interest Group of Portland, Oreg. 97214. The *PCI Local Bus Specification* is incorporated herein by reference. Of particular importance to the present invention is the fact that the expansion bus 329 is designed as a LE bus, capable of transferring 32 bits of data in parallel, with addresses having byte granularity.

In the exemplary system, a video input device 331, which is connected to the expansion bus 329, supplies pixel data that needs to be written to the frame buffer 317 in real time. The pixel data are in conformance with the pixel encoding formats utilized by the RAMDAC 323, and may therefore be in any of the following well-known encoding formats: 8 bpp αRGB, 1-5-5-5 αRGB (i.e., 16 bpp) or 8-8-8-8 αRGB (i.e., 32 bpp). The video input device 331 may itself generate pixels that are in either BE or LE format. These pixels are communicated to the bridge/graphics controller by means of the expansion bus 329, which operates consistently in an LE mode. Consequently, there is the potential need to convert the received pixels into BE mode before storing them into the frame buffer 317.

It can be seen that whether or not the need exists to convert pixels being written into and read from the frame buffer 317 depends on three parameters:

1) the pixel type (i.e., BE or LE) that the processor 307 or video input device 331 expects to see;
2) whether the bus over which the pixels are to be communicated is operating in BE or LE mode; and
3) the so-called "pixel depth," that is, whether a complete pixel comprises 8, 16 or 32 bits.

The various possibilities will now be described in detail. For each of these, it should be remembered that the RAM- DAC 323 requires that frame buffer have stored therein BE-type pixels in accordance with a BE addressing scheme. Thus, 32 bpp pixels should be stored in the following format:

| Byte0 | Byte1 | Byte2 | Byte3 | Byte4 | Byte5 | Byte6 | Byte7 |
|---|---|---|---|---|---|---|---|
| α0 | R0 | G0 | B0 | α1 | R1 | G1 | B1 |

As to 16 bpp pixels, these should be stored into the RAMDAC 323 in the following format:

| Byte0 | Byte1 | Byte2 | Byte3 | Byte4 | Byte5 | Byte6 | Byte7 |
|---|---|---|---|---|---|---|---|
| α0R0G0 | G0B0 | α1R1G1 | G1B1 | α2R2G2 | G2B2 | α3R3G3 | G3B3. |

Finally, 8 bpp pixels should be stored into the RAMDAC in the following form:

| Byte0 | Byte1 | Byte2 | Byte3 | Byte4 | Byte5 | Byte6 | Byte7 |
|---|---|---|---|---|---|---|---|
| P0 | P1 | P2 | P3 | P4 | P5 | P6 | P7 |

Now, looking first at the system bus 301, this is a 64-bit wide BE bus, having bits numbered 0:63, with bit 0 being the most significant. The left-most bit of any item (byte, word, long, double) is always the most significant. The bytes are numbered 0:7 so that bit 0 of the bus is the most significant bit of byte 0, bit 63 is the least significant bit of byte 7, and byte 0 is the most significant eight bits (i.e., bits 0:7). The left-most byte of any item (byte, word, long, double) is the most significant.

On the system bus 301, when it is in BE mode, two 32 bpp BE pixels look like:

| Byte0 | Byte1 | Byte2 | Byte3 | Byte4 | Byte5 | Byte6 | Byte7 |
|---|---|---|---|---|---|---|---|
| α0 | R0 | G0 | B0 | α1 | R1 | G1 | B1 |

On the system bus 301, when it is in BE mode, four 16 bpp BE pixels look like:

| Byte0 | Byte1 | Byte2 | Byte3 | Byte4 | Byte5 | Byte6 | Byte7 |
|---|---|---|---|---|---|---|---|
| α0R0G0 | G0B0 | α1R1G1 | G1B1 | α2R2G2 | G2B2 | α3R3G3 | G3B3. |

Note that the G component of each pixel actually spans two bytes. This is because the first byte contains α (1 bit), and R (5 bits), and 2 bits of G. The next byte contains 3 bits of G and the 5 bits of B.

On the system bus 301, when it is in BE mode, eight 8 bpp pixels look like:

| Byte0 | Byte1 | Byte2 | Byte3 | Byte4 | Byte5 | Byte6 | Byte7 |
|---|---|---|---|---|---|---|---|
| P0 | P1 | P2 | P3 | P4 | P5 | P6 | P7 |

Note that there is no point in designating the pixel type as BE or LE, since each byte is an entire pixel. This is the "common" mode of operation for systems such as the Apple Macintosh operating system and its data. However, it was previously explained that a different operating system running on the processor 307 could be running in LE mode. The format of this data will be described next.

On the system bus 301, when it is in BE mode, two 32 bpp LE pixels look like:

| Byte0 | Byte1 | Byte2 | Byte3 | Byte4 | Byte5 | Byte6 | Byte7 |
|---|---|---|---|---|---|---|---|
| B0 | G0 | R0 | $\alpha$0 | B1 | G1 | R1 | $\alpha$1 |

On the system bus 307, when it is in BE mode, four 16 bpp LE pixels look like:

| Byte0 | Byte1 | Byte2 | Byte3 | Byte4 | Byte5 | Byte6 | Byte7 |
|---|---|---|---|---|---|---|---|
| G0B0 | $\alpha$0R0G0 | G1B1 | $\alpha$1R1G1 | G2B2 | $\alpha$2R2G2 | G3B3 | $\alpha$3R3G3 |

On the system bus 301, when it is in BE mode, eight 8 bpp pixels look like:

| Byte0 | Byte1 | Byte2 | Byte3 | Byte4 | Byte5 | Byte6 | Byte7 |
|---|---|---|---|---|---|---|---|
| P0 | P1 | P2 | P3 | P4 | P5 | P6 | P7 |

Note that, except for the 8 bpp pixels, these pixels look very strange. The 32 bpp and 16 bpp pixels have the bytes within the pixels swapped so that the least significant byte becomes the most significant, and vice versa. This is because of the principle of address invariance, which was described above. Address invariance maintains byte lane consistency across busses.

Now consider the case where the processor 307 is operating in LE mode. In this mode, the system bus masters change the address of the data they are accessing based on the size of the access. This is because the main memory subsystem 309 is BE but the order of the data items in memory is most-significant going from fight to left.

On the system bus 301, when it is in LE mode, two 32 bpp LE pixels look like:

| Byte0 | Byte1 | Byte2 | Byte3 | Byte4 | Byte5 | Byte6 | Byte7 |
|---|---|---|---|---|---|---|---|
| $\alpha$1 | R1 | G1 | B1 | $\alpha$0 | R0 | G0 | B0 |

On the system bus 301, when it is in LE mode, four 16 bpp LE pixels look like:

| Byte0 | Byte1 | Byte2 | Byte3 | Byte4 | Byte5 | Byte6 | Byte7 |
|---|---|---|---|---|---|---|---|
| $\alpha$3R3G3 | G3B3 | $\alpha$2R2G2 | G2B2 | $\alpha$1R1G1 | G1B1 | $\alpha$0R0G0 | G0B0. |

Note again that the G component of each pixel actually spans two bytes. This is again because the first byte contains $\alpha$ (1 bit), and R (5 bits), and 2 bits of G. The next byte contains 3 bits of G and the 5 bits of B.

On the system bus 301, when it is in LE mode, eight 8 bpp pixels look like:

| Byte0 | Byte1 | Byte2 | Byte3 | Byte4 | Byte5 | Byte6 | Byte7 |
|---|---|---|---|---|---|---|---|
| P7 | P6 | P5 | P4 | P3 | P2 | P1 | P0 |

It is "normal" for a LE operating system to deal with LE formatted pixels. However, it is possible that data written by a different (i.e., BE) operating system could be written into the main memory subsystem 309 in LE mode. The format of this data will be described next.

On the system bus 301, when it is in LE mode, two 32 bpp BE pixels look like:

| Byte0 | Byte1 | Byte2 | Byte3 | Byte4 | Byte5 | Byte6 | Byte7 |
|---|---|---|---|---|---|---|---|
| B1 | G1 | R1 | α1 | B0 | G0 | R0 | α0 |

On the system bus 301, when it is in LE mode, four 16 bpp BE pixels look like:

| Byte0 | Byte1 | Byte2 | Byte3 | Byte4 | Byte5 | Byte6 | Byte7 |
|---|---|---|---|---|---|---|---|
| G3B3 | α3R3G3 | G2B2 | α2R2G2 | G1B1 | α1R1G1 | G0B0 | α0R0G0 |

Note again that the G component of each pixel actually spans two bytes. This is again because the first byte contains α (1 bit, and R (5 bits), and 2 bits of G. The next byte contains 3 bits of G and the 5 bits of B.

On the system bus 301, when it is in LE mode, eight 8 bpp pixels look like:

| Byte0 | Byte1 | Byte2 | Byte3 | Byte4 | Byte5 | Byte6 | Byte7 |
|---|---|---|---|---|---|---|---|
| P7 | P6 | P5 | P4 | P3 | P2 | P1 | P0 |

The format of pixel types on the system bus 301 in all modes and pixel depths has now been described. It is possible for any of these to be written to the frame buffer 317.

Next, the expansion bus 329 will be considered. The expansion bus 329 has 32 bits numbered 31:0, with bit 31 being the most significant bit. It can be seen from this numbering scheme that the expansion bus 329 is a LE bus. The left-most bit of any item (byte, word, long, double) is the most significant. The bytes are numbered 3:0 so that bit 31 of the bus is the most significant bit of byte 3, bit 0 is the least significant bit of byte 0, and byte 3 is the most significant eight bits (i.e., bits 31:24). The left most byte of any item (byte, word, long, double) is the most significant.

Although the expansion bus is itself LE, both LE and BE pixel types are allowed to be communicated. The following describes the format of these pixels. Note that bytes 7:0 are depicted, although the expansion bus 329 is only 32 bits wide. This is because on a two beat expansion bus access, bytes 3:0 are transferred on the first data phase and bytes 7:4 are transferred on the second data phase.

On the expansion bus 329, two 32 bpp LE pixels look like:

| Byte3 | Byte2 | Byte1 | Byte0 |
|---|---|---|---|
| α0 | R0 | G0 | B0 |
| Byte7 | Byte6 | Byte5 | Byte4 |
| α1 | R1 | G1 | B1 |

On the expansion bus 329, four 16 bpp LE pixels look like:

| Byte3 | Byte2 | Byte1 | Byte0 |
|---|---|---|---|
| α1R1G1 | G1B1 | α0R0G0 | G0B0 |
| Byte7 | Byte6 | Byte5 | Byte4 |
| α3R3G3 | G3B3 | α2R2G2 | G2B2. |

Note again that the G component of each pixel actually spans two bytes. This is again because the first byte contains a (1 bit), and R (5 bits), and 2 bits of G. The next byte contains 3 bits of G and the 5 bits of B.

On the expansion bus 329, eight 8 bpp pixels look like:

| | | | |
|---|---|---|---|
| Byte3 | Byte2 | Byte1 | Byte0 |
| P3 | P2 | P1 | P0 |
| Byte7 | Byte6 | Byte5 | Byte4 |
| P7 | P6 | P5 | P4 |

It is "normal" for this LE bus to deal with LE formatted pixels as described above. However, it is possible that BE data may need to be transferred on this bus if the processor running its software is in Big Endian mode. The format of this data will be described next.

On the expansion bus 329, two 32 bpp BE pixels look like:

| | | | |
|---|---|---|---|
| Byte3 | Byte2 | Byte1 | Byte0 |
| B0 | G0 | R0 | α0 |
| Byte7 | Byte6 | Byte5 | Byte4 |
| B1 | G1 | R1 | α1 |

On the expansion bus 329, four 16 bpp BE pixels look like:

| | | | |
|---|---|---|---|
| Byte3 | Byte2 | Byte1 | Byte0 |
| G1B1 | α1R1G1 | G0B0 | α0R0G0 |
| Byte7 | Byte6 | Byte5 | Byte4 |
| G3B3 | α3R3G3 | G2B2 | α2R2G2. |

Note again that the G component of each pixel actually spans two bytes. This is again because the first byte contains α (1 bit), and R (5 bits), and 2 bits of G. The next byte contains 3 bits of G and the 5 bits of B.

On the expansion bus 329, eight 8 bpp pixels look like:

| | | | |
|---|---|---|---|
| Byte3 | Byte2 | Byte1 | Byte0 |
| P3 | P2 | P1 | P0 |
| Byte7 | Byte6 | Byte5 | Byte4 |
| P7 | P6 | P5 | P4 |

The format of all pixel types on the expansion bus 329 in all modes and pixel depths has now been described. It is possible for any of these to be written to the frame buffer 317.

It is noted that the bridge/graphics controller 311 also serves as a bridge for communications between the expansion bus 329 and the system bus 301. All data transferred between the system bus 301 and the expansion bus 329 is governed by address invariance. Accordingly, the bridge/graphics controller 311 includes the necessary hardware to enforce address invariance.

The effect of address invariance on data flowing between the system bus 301 and the expansion bus 329 is dependent on the processor endian mode. In LE mode, the bytes change byte lanes in what is called "Pass Through" mode. This allows LE data (including but not limited to pixels) to be transferred between the system bus 301 and the expansion bus 329 and to be LE on both buses.

In BE mode, the bytes change byte lanes by what is called "byte swapping". This allows BE data (including but not limited to pixels) to be transferred between the system bus 301 and the expansion bus 329 and to be BE on both buses.

Figure 4:
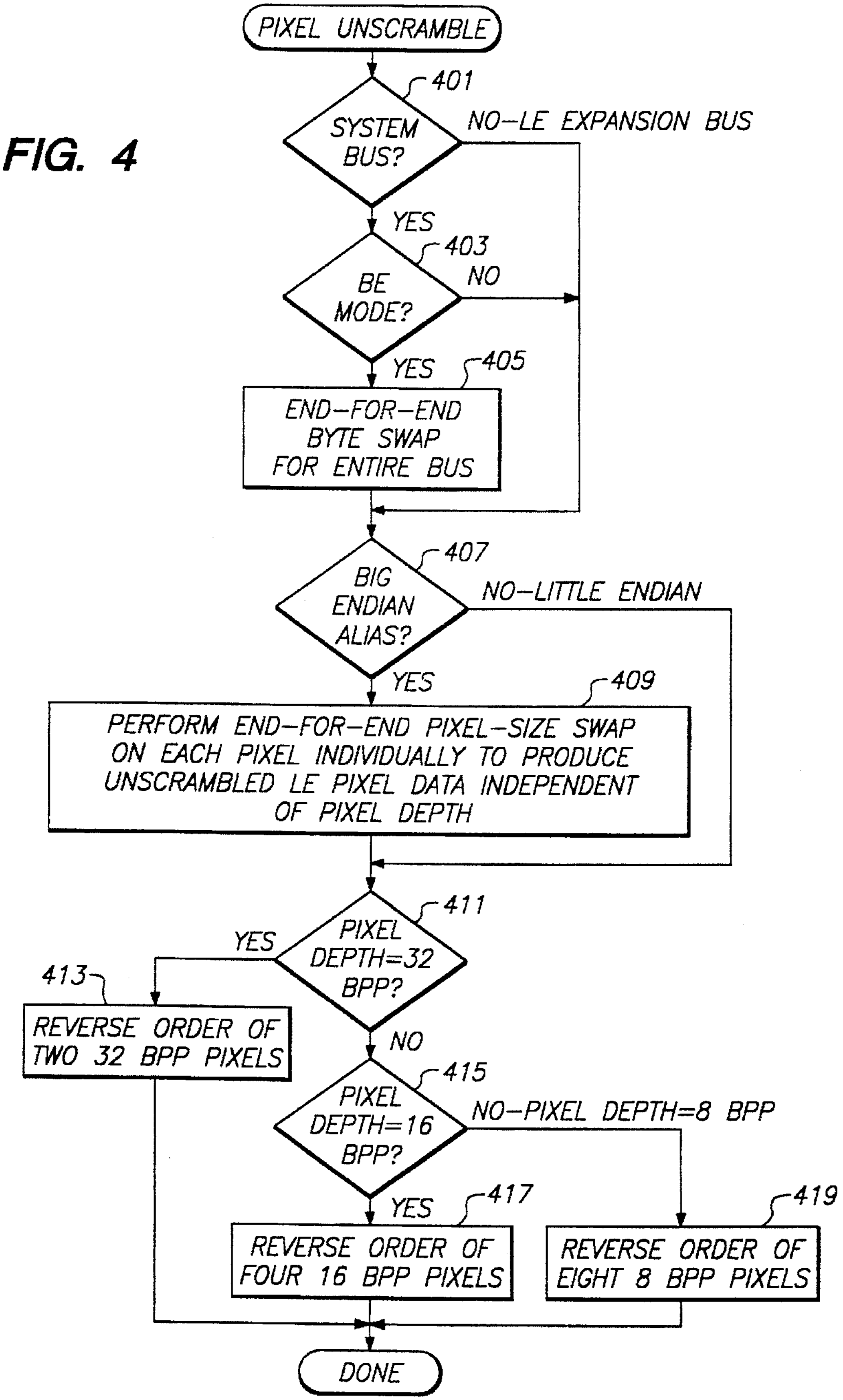
FIG. 4 is a flow chart of the steps performed by the pixel unscramble logic in accordance with the present invention.
Figure 5:
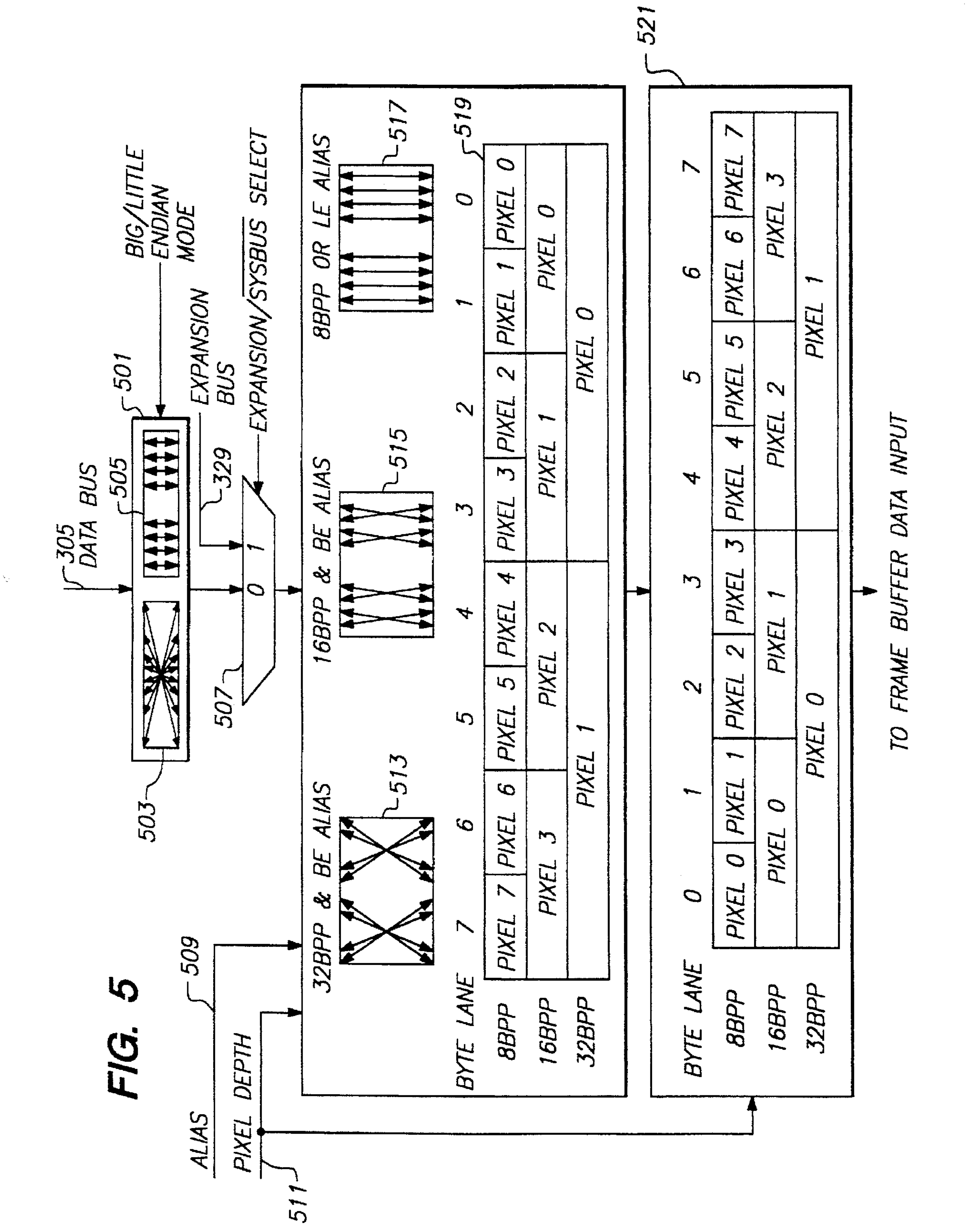
FIG. 5 illustrates the nature of the various data transformations brought about by the steps carried out in accordance with the present invention.

In accordance with the present invention, the bridge/graphics controller 311 includes pixel unscramble logic 325, that detects the need for pixel conversion and then performs the conversion, if necessary. The operation of the pixel unscramble logic 325 will now be described with reference to FIGS. 4 and 5. FIG. 4 is a flow chart of the steps performed by the pixel unscramble logic 325 in order to conditionally convert pixel data, received via either of the system or expansion buses 301, 329, into the standard BE-type, BE-addressable pixel data for storage into the frame buffer 317. FIG. 5 illustrates the nature of the various data transformations brought about by the steps illustrated in FIG. 4.

In a preferred embodiment of the invention, two-beat writes are performed on the expansion bus 329, with data from each beat of the write operation being accumulated for presentation as a single 64-bit wide data unit, in conformity with the preferred width of the frame buffer 317. It is unnecessary to do this for the system bus 301, which already has a 64-bit wide data bus 305.

Beginning at decision step 401, the source of the pixel data is first tested. If the source is the expansion bus 329, then processing skips down to decision step 407 (described below). This step is represented in FIG. 5 by the multiplexor 507.

If the source of the pixel data is the system data bus 305, then processing continues to decision step 403, where it is determined what mode the processor 307 is operating in (i.e., either LE or BE). This information is preferably established during system initialization, and stored in a control register that is accessible to the pixel unscramble logic 325.

If the processor 307 is operating in LE mode, then processing skips down to block 407 (i.e., the processor 307 is behaving like the expansion bus 329. This is represented in FIG. 5 by the "pass-through" block 505, in which the data received from the system data bus 305 undergoes no transformation whatsoever.

If the system bus 301 is operating in BE mode, then an end-for-end byte swap of all of the data on the 64-bit wide system data bus 305 is performed. This is illustrated by the byte-swap logic 503 in FIG. 5. As mentioned earlier, this step is generally required in bus bridges that connect mixed-endian systems, in order to maintain address invariance. Therefore, the output of the byte-swap logic 503 may also be supplied directly for output onto the expansion bus 329, if a bridge operation is being performed. For clarity, the path for this ancillary operation has not been depicted in FIG. 5.

Processing then continues to decision step 407, where the endian-"alias" (also called "aperture") of the pixel data is determined. The alias signifies whether the writing entity (e.g., the processor 307 or the video input device 331) considers its pixels to be BE or LE. This information is preferably encoded as part of the pixel address, the remainder of which indicates where in the frame buffer 317, the pixel data is to be stored. The alias indicator 509 is also shown in FIG. 5.

If the writing entity considers itself to be writing LE pixels, then processing skips down to decision step 411 (described in more detail below). In FIG. 5, this is represented by the second pass-through block 517.

However, if a BE alias is indicated, the processing continues to block 409, where the pixel depth 511 is determined. Pixel depth 511 is preferably established during an initialization of the system, and stored in a control register that is accessible to the pixel unscramble logic 325.

In step 409, each pixel is individually subjected to an end-for-end byte swap of its data. Thus, if the pixel depth 511 indicates the presence of 32 bpp pixels, then the four bytes of each of the two pixels are swapped end-for-end as depicted in block 513 of FIG. 5. Alternatively, if the pixel depth 511 indicates the presence of 16 bpp pixels, then the two bytes of each of the four pixels are swapped end-for-end as depicted in block 515. As a third alternative, if the pixel depth 511 indicates 8 bpp pixels, then no byte-swapping can be performed (it is meaningless to swap a single byte with itself). Accordingly, the 8 bpp pixels are unchanged by this step, as depicted by the second pass-through block 517.

As a result of the processing performed by step 409, or alternatively as a result of the alias indicator 509 designating the presence of LE-type pixels, the 64 bits of pixel data are guaranteed to be in LE order, regardless of the pixel depth. The format of these pixels is illustrated by block 519 of FIG. 5. Consequently, all that remains is to move the pixels (without changing their pixel-type) into the desired BE-order. This processing is conditional, based only on the pixel depth 511. Thus, if the pixel depth 511 indicates 32 bpp pixels ("YES" output from decision step 411), then the order of the two 32 bpp pixels is reversed (step 413). Alternatively, if the pixel depth 511 indicates the presence of 16 bpp pixels ("YES" output from decision step 415), then the order of the four 16 bpp pixels is reversed (step 417). As a final alternative, if the pixel depth 511 indicates the presence of 8 bpp pixels ("NO" output from decision step 415), then the order of the eight 8 bpp pixels is reversed (step 419).

At the completion of this processing, the pixels are guaranteed to be BE-type, in BE order, as depicted in block 521 of FIG. 5. They are now in a suitable format for writing to the frame buffer 317.

The present invention may also be utilized for reading pixels from the frame buffer 317. This merely requires adapting the above-described steps to be performed in essentially reverse order. That is, in servicing a frame buffer read operation, one would first utilize the pixel depth 511 to decide how to swap the pixels shown in block 521 to arrive at the corresponding pixels depicted in block 519. Next, both the pixel depth 511 and alias 509 would be tested to determine which of the end-for-end pixel swaps 513, 515 or alternatively the second pass-through 517 should be performed. If the destination of the data is the expansion bus 329, then no further unscrambling need be performed. However, if the destination is the system data bus 305, then the mode of the processor 307 (i.e., either LE or BE) is used to conditionally pass (LE mode) or end-for-end byte swap (BE) the data. The output of this step may then be supplied to the system data bus 305.

Figure 6:
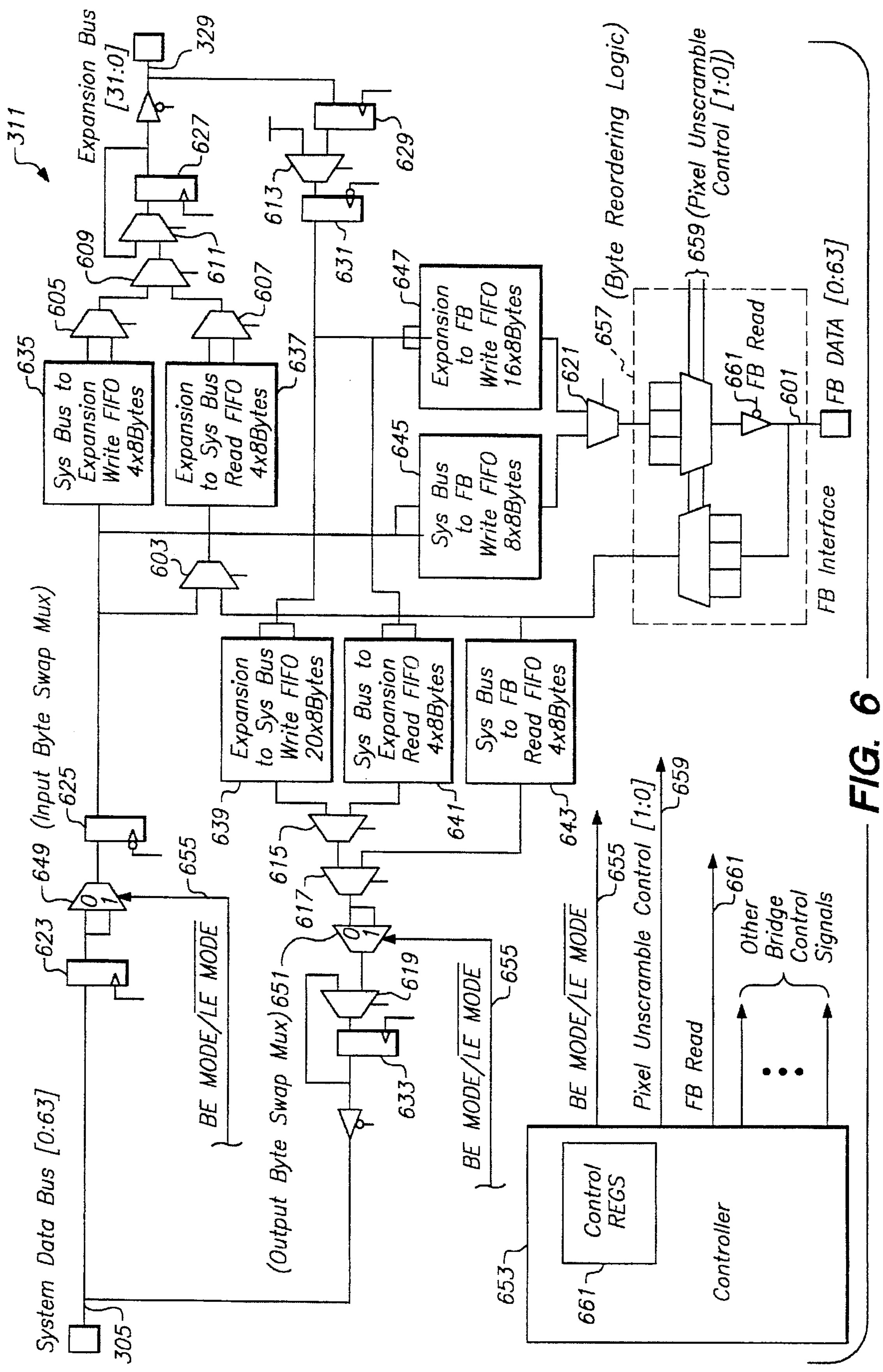
FIG. 6 is a block diagram of the overall data flow within the inventive bridge/graphics controller.

A preferred implementation of the invention will now be described in more detail with reference made to FIGS. 6, 7A–7B and 8. FIG. 6 is a block diagram of the overall data flow within the bridge/graphics controller 311. Three data interfaces are provided for connection to the following: the 64-bit wide system data bus 305, the 32-bit wide expansion bus 329 (which, in a preferred embodiment is multiplexed between address and data information), and the 64-bit wide frame buffer (FB) data bus 601. Various multiplexors 603, 605, 607, 609, 611, 613, 615, 617, 619, 621 and flip-flops 623, 625, 627, 629, 631, 633 are provided, along with a number of FIFOs 635, 637, 639, 641, 643, 645, 647 that are arranged within the data paths as shown, for switching the data from any one source to any of the other destinations, for buffering data between the various sources and destinations, and for converting between the 64-bit and 32-bit interfaces.

The bridge/graphics controller 311 further includes a controller 653 for generating the various control signals that are required for coordinating the operation of all of the resources within the bridge/graphics controller. In a preferred embodiment, the bridge/graphics controller 311 comprises two application specific integrated circuits (ASICs), one comprising all of the data flow hardware, and the other comprising all of the necessary control logic.

For the sake of clarity, the control signal connections between the controller 653 and each of the resources have been omitted from the figure. Also not shown are the interfaces between the controller 653 and the system bus 305, expansion bus 329, and frame buffer 317. A description of these interfaces, which are well-known in the art, is beyond the scope of this invention.

Of particular pertinence to the present invention are: the SysBus-to-FB write FIFO 645, which buffers 64-bit wide data that is to be written from the system data bus 305 into the frame buffer 317; the ExpansionBus-to-FB write FIFO 647, which buffers 64-bit wide data that is to be written to the frame buffer 317; the SysBus-to-FB Read FIFO 643, which buffers 64-bit wide data that has been read from the frame buffer 317 for the purpose of being sent to a destination on the system data bus 305; and the ExpansionBus-to-SysBus Read FIFO 637, which can be selected, by the multiplexor 603, to receive 64-bit wide data that has been read from the frame buffer 317 for the purpose of being sent to a destination on the expansion bus 329. In each instance, the 64-bit wide data may consist alternatively of two 32 bpp pixels, four 16 bpp pixels or eight 8 bpp pixels as described in detail above.

In accordance with the present invention, the bridge/graphics controller 311 includes an input byte swap multiplexor 649 and an output byte swap multiplexor 651, each activated for byte-swapping by assertion of the BE MODE/LE MODE* control signal) 655. When activated during data transfers between the system data bus 305 and the expansion bus 329, each of the input and output byte swap multiplexors 649, 651 performs the end-to-end byte swapping that is necessary for maintaining address invariance.

However, the input and output byte swap multiplexors 649, 651 serve another function in that they, in conjunction with the byte reordering logic 657, make up the pixel unscramble logic 325. Operation of the pixel unscramble logic 325 is controlled by the BE MODE/LE MODE* signal 655 in conjunction with the PIXEL UNSCRAMBLE CONTROL signals 659. Each of these control signals is generated by the controller 653 based on information about the processor mode (i.e., BE or LE), pixel depth (i.e., 32 bpp, 16 bpp or 8 bpp) and the alias of the pixel transfer. Information about the processor mode and pixel depth is provided to the controller 653 by the processor 307 during system initialization. The controller stores this information in corresponding ones of its control registers 661. The alias of the pixel transfer changes dynamically, and so cannot be set during an initialization phase. Instead, the alias is decoded on a per transaction basis by the controller from the endian-alias type tag that is encoded as part of the address, which also designates the location in the frame buffer 317 to/from which the pixel data is to be stored/retrieved. As mentioned above, address aliasing techniques are described in U.S. Pat. No. 5,301,272, and are therefore not described here in detail.

Figure 7A:
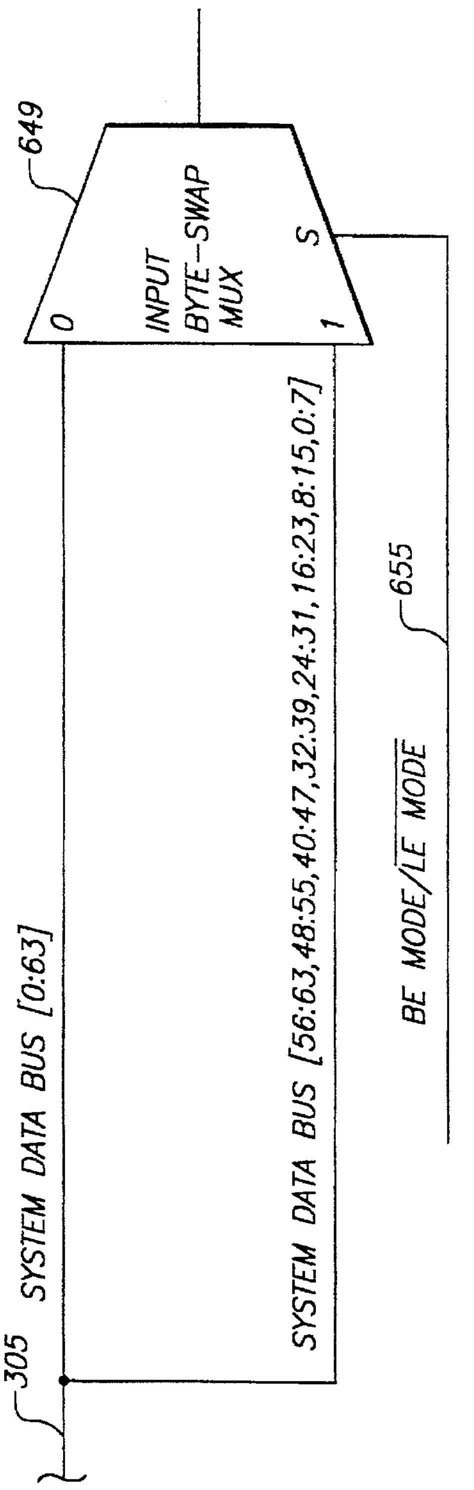
FIGS. 7A and 7B are detailed block diagrams of the input and output byte swap multiplexors in accordance with the invention.
Figure 7B:
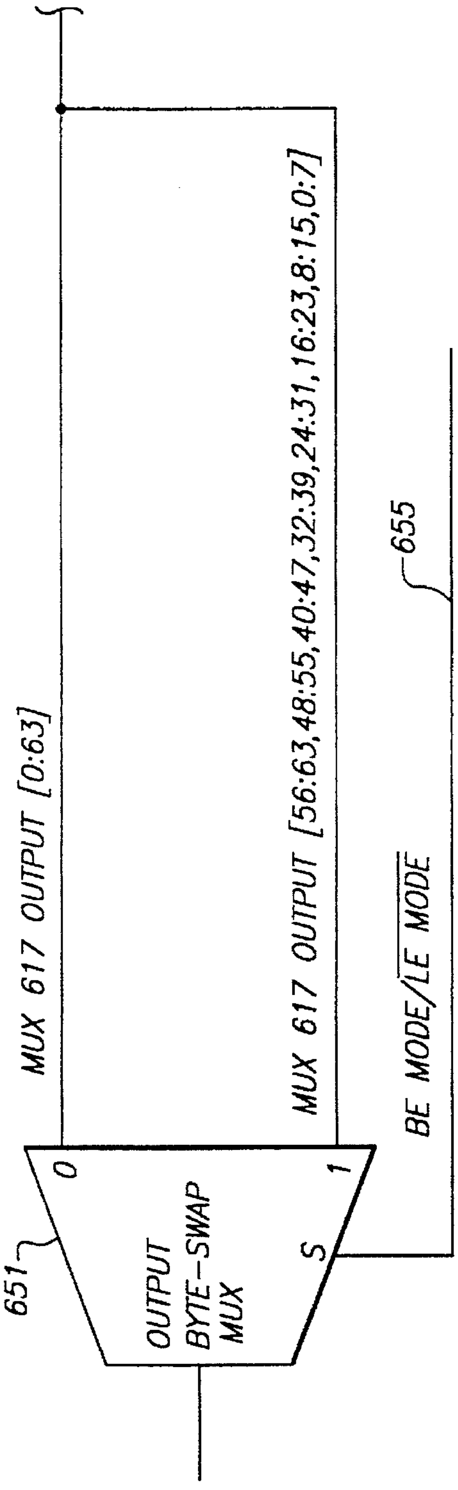

The controller 653, input and output byte swap multiplexors 649, 651, and byte reordering logic 657 carry out the functions that were described above and illustrated in FIGS. 4 and 5. The input byte swap multiplexor 649, which is depicted in greater detail in FIG. 7A, performs the end-for-end byte swap of the entire system data bus 305 that is used during frame buffer write operations as described at step 405 of FIG. 4 and depicted in block 503 of FIG. 5. As shown in FIG. 7A, the input byte-swap multiplexor has two inputs, with selection being based on the value of the BE MODE/LE MODE* signal 655. The "0" input of the input byte-swap multiplexor 649 allows the system data bus 305 to pass through to the output 651 unchanged. By contrast, the "1" input of the input byte-swap multiplexor 649 is coupled to the system data bus 305 in the manner shown in the drawing, so that the data on the bus is swapped end-for-end by the time it reaches the output of the multiplexor.

The output byte-swap multiplexor 651 is designed essentially in the same manner as the input byte-swap multiplexor 651, but it is arranged within the bridge/graphics controller in a manner so as to perform its function when data is being moved from the frame buffer 317 (or expansion bus 329) to the system data bus 305. Thus, as illustrated in detail in FIG. 7B, the output byte-swap multiplexor 651 is a multiplexor having a "0" input coupled to pass data straight through to the output without transformation. The "1" input of the output byte-swap multiplexor 651 is coupled to perform an end-for-end byte swap of its 64-bit input. Alternative selection of either pass-through or byte-swap mode is controlled by the BE MODE/LE MODE* signal 655.

Returning now to FIG. 6, it can be seen that data to be written into the frame buffer 317 must pass through the multiplexor 621, which feeds one input of the byte reordering logic 657. The purpose of the byte reordering logic 657 is to perform the transformations described above with respect to steps 407 through 419 of FIG. 4 and depicted in blocks 513, 515, 519 and 521 of FIG. 5.

Figure 8:
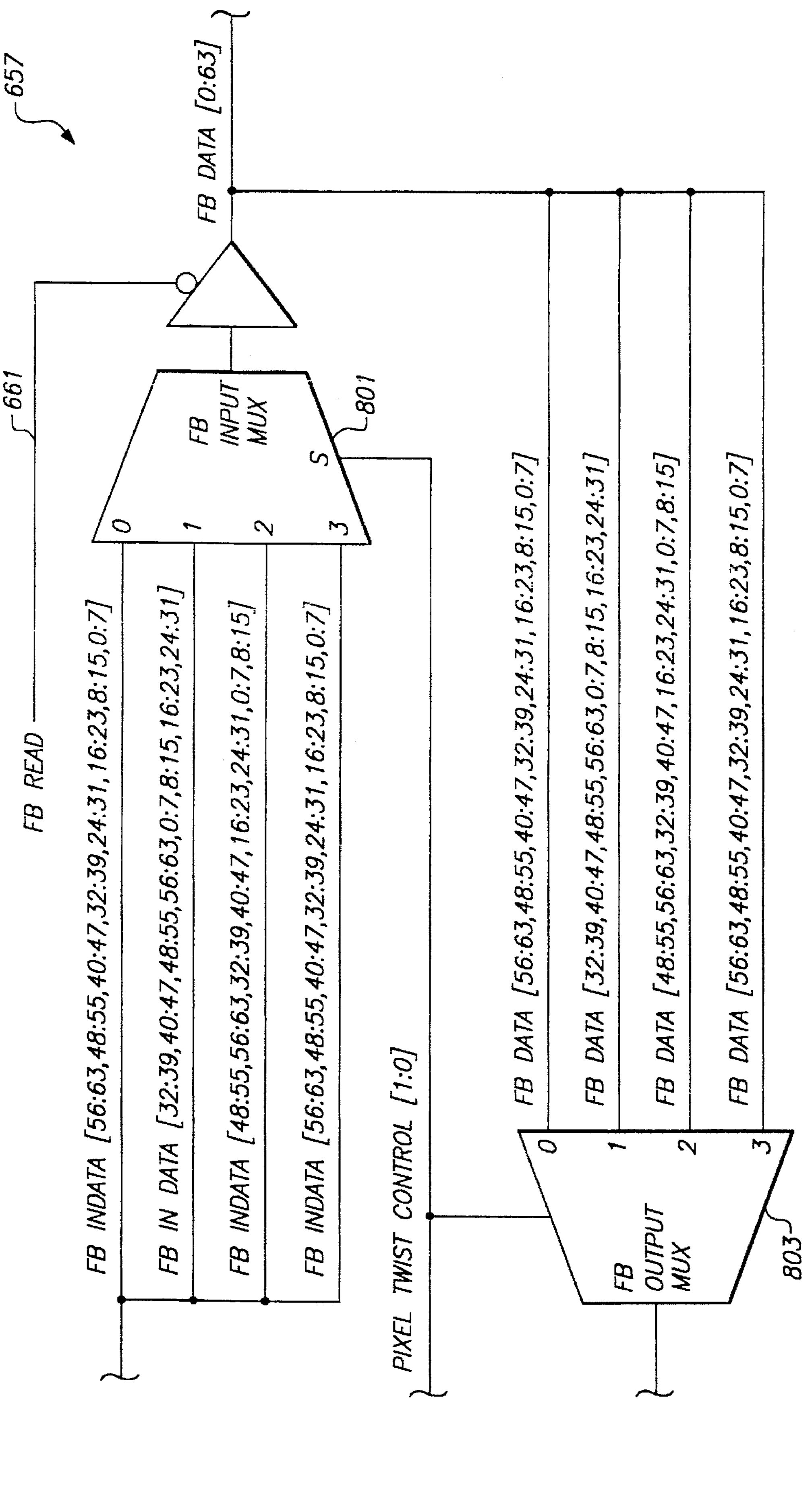
FIG. 8 is a detailed block diagram of the byte reordering logic in accordance with the invention.

Referring now to FIG. 8, the byte reordering logic 657 is shown in greater detail. The FB input multiplexor 801 is utilized during frame buffer write operations (deactivation of the FB READ signal 661 causes the output of the FB input multiplexor 801 to be placed onto the FB data bus 601). The FB output multiplexor 803 performs its data transformations during frame buffer read operations. Except for their directionality within the bridge/graphics controller 311, the input and output frame buffer multiplexors 801, 803 are configured to perform the same type of data transformation as one another, as specified by the pixel unscramble control signals 659 that are supplied by the controller 653. This operation will now be described.

For each of the input and output frame buffer multiplexors 801, 803, input "0" is connected to a 64-bit wide source in a manner that produces an end-for-end byte swap of the data being supplied at this input. In accordance with the invention, the pixel unscramble control signals 659 select multiplexor input "0" to be gated to the output whenever the address alias decoded by the controller 653 designates a BE-type signal, regardless of pixel depth.

For each of the input and output frame buffer multiplexors 801, 803, input "1" is connected to a 64-bit wide source in a manner that produces an end-for-end word (=32 bits) swap of the data being supplied at this input. In accordance with the invention, the pixel scramble control signals 659 select multiplexor input "1" to be gated to the output whenever the address alias decoded by the controller 653 designates a LE-type signal AND the pixel depth is equal to 32 bpp.

Next, for each of the input and output frame buffer multiplexors 801, 803, input "2" is connected to a 64-bit wide source in a manner that produces an end-for-end half-word (=16 bits) swap of the data being supplied at this input. In accordance with the invention, the pixel unscramble control signals 659 select multiplexor input "2" to be gated to the output whenever the address alias decoded by the controller 653 designates a LE-type signal AND the pixel depth is equal to 16 bpp.

Finally, for each of the input and output frame buffer multiplexors 801, 803, input "3" is connected to a 64-bit wide source in a manner that produces an end-for-end byte swap of the data being supplied at this input. In accordance with the invention, the pixel unscramble control signals 659 select multiplexor input "3" to be gated to the output whenever the address alias decoded by the controller 653 designates a LE-type signal AND the pixel depth is equal to 8 bpp.

The pixel unscramble logic 325 as depicted in FIGS. 6, 7A–7B and 8 are advantageous because they represent a very compact hardware implementation of the conditional conversion algorithm described above with reference to FIGS. 4 and 5. An additional benefit is gained by the ability to further use the output of the input and output byte swap multiplexors 649 whenever address invariance transformations need to be performed within the bridge/graphics controller 311, thereby eliminating the need for hardware dedicated only for this function.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for transforming a plurality of pixel data that were received on a data bus into an expected format for storage in a frame buffer, the apparatus comprising:

a first multiplexor comprising:
- an output;
- a first input coupled to the data bus in a manner that provides for pass-through of data from the data bus to the output of the first multiplexor;
- a second input coupled to the data bus in a manner that provides for an end-for-end byte swap of data from the data bus to the output of the first multiplexor, whereby a most significant byte on the data bus becomes a least significant byte at the output of the first multiplexor, a next most significant byte on the data bus becomes a next least significant byte at the output of the first multiplexor, and so on until a least significant byte on the data bus becomes a most significant byte at the output of the first multiplexor; and
- means for receiving a byte swap control signal that alternatively selects one of the first and second inputs of the first multiplexor to be gated to the output of the first multiplexor;

a second multiplexor comprising:
- an output for supplying conditionally transformed data to the frame buffer;
- a first input coupled to the output of the first multiplexor in a manner that provides for an end-for-end byte swap of first multiplexor output data to the output of the second multiplexor, whereby a most significant byte at the output of the first multiplexor becomes a least significant byte at the output of the second multiplexor, a next most significant byte at the output of the first multiplexor becomes a next least significant byte at the output of the second multiplexor, and so on until a least significant byte at the output of the first multiplexor becomes a most significant byte at the output of the second multiplexor;

a second input coupled to the output of the first multiplexor in a manner that provides for an end-for-end word swap of first multiplexor output data to the output of the second multiplexor, whereby a most significant word at the output of the first multiplexor becomes a least significant word at the output of the second multiplexor, and a least significant word at the output of the first multiplexor becomes a most significant word at the output of the second multiplexor;

a third input coupled to the output of the first multiplexor in a manner that provides for an end-for-end half-word swap of first multiplexor output data to the output of the second multiplexor, whereby a most significant half-word at the output of the first multiplexor becomes a least significant half-word at the output of the second multiplexor, a next most significant half-word at the output of the first multiplexor becomes a next least significant half-word at the output of the second multiplexor, and so on until a least significant half-word at the output of the first multiplexor becomes a most significant half-word at the output of the second multiplexor;

a fourth input coupled to the output of the first multiplexor in a manner that provides for the end-for-end byte swap of first multiplexor output data to the output of the second multiplexor, whereby the most significant byte at the output of the first multiplexor becomes the least significant byte at the output of the second multiplexor, the next most significant byte at the output of the first multiplexor becomes the next least significant byte at the output of the second multiplexor, and so on until the least significant byte at the output of the first multiplexor becomes the most significant byte at the output of the second multiplexor; and means for receiving a reorder control signal that alternatively selects one of the first, second, third and fourth inputs of the second multiplexor to be gated to the output of the second multiplexor; and control means for generating the byte swap control signal and the reorder control signal, wherein generation of the byte swap control signal is based on an endian-ness characteristic of the data bus, and wherein generation of the reorder control signal is based on a pixel depth of pixel data on the data bus and is based further on a pixel endian-ness type of pixel data on the data bus.

2. The apparatus of claim 1, wherein the control means decodes the pixel endian-ness type from a pixel endian-ness type tag encoded in an address that is associated with the pixel data on the data bus.

3. A method for transforming a plurality of pixel data that were received on a data bus into an expected format for storage in a frame buffer, the method comprising the steps of:

conditionally transforming the pixel data in response to an endian-ness characteristic of the data bus by alternatively leaving the pixel data unchanged or performing an end-for-end byte swap of the pixel data, wherein the end-for-end byte swap of the pixel data causes a most significant byte of the pixel data to become a least significant byte of the conditionally transformed pixel data, a next most significant byte of the pixel data to become a next least significant byte of the conditionally transformed pixel data, and so on until a least significant byte of the pixel data becomes a most significant byte of the conditionally transformed pixel data; and selectively transforming the conditionally transformed pixel data in response to a pixel depth of pixel data on the data bus and further in response to a pixel endian-ness type of pixel data on the data bus, the step of selectively transforming the conditionally transformed pixel data comprising alternatively performing an end-for-end byte swap of the conditionally transformed pixel data, or performing an end-for-end word swap of the conditionally transformed pixel data, or performing an end-for-end half-word swap of the conditionally transformed pixel data, wherein:

the end-for-end byte swap of the conditionally transformed pixel data causes a most significant byte of the conditionally transformed pixel data to become a least significant byte of the selectively transformed pixel data, a next most significant byte of the conditionally transformed pixel data to become a next least significant byte of the selectively transformed pixel data, and so on until a least significant byte of the conditionally transformed pixel data becomes a most significant byte of the selectively transformed pixel data;

the end-for-end word swap of the conditionally transformed pixel data causes a most significant word of the conditionally transformed pixel data to become a least significant word of the selectively transformed pixel data, a next most significant word of the conditionally transformed pixel data to become a next least significant word of the selectively transformed pixel data, and so on until a least significant word of the conditionally transformed pixel data becomes a most significant word of the selectively transformed pixel data; and the end-for-end half-word swap of the conditionally transformed pixel data causes a most significant half-word of the conditionally transformed pixel data to become a least significant half-word of the selectively transformed pixel data, a next most significant half-word of the conditionally transformed pixel data to become a next least significant half-word of the selectively transformed pixel data, and so on until a least significant half-word of the conditionally transformed pixel data becomes a most significant half-word of the selectively transformed pixel data.

4. The method of claim 3, further comprising the step of decoding the pixel endian-ness type from a pixel endian-ness type tag encoded in an address that is associated with the pixel data on the data bus.

* * * * *